United States Patent [19]

Shimura et al.

[11] Patent Number: 4,655,228

[45] Date of Patent: Apr. 7, 1987

[54] ULTRASONIC DIAGNOSIS APPARATUS FOR TISSUE CHARACTERIZATION

[75] Inventors: Takaki Shimura, Machida; Keiichi Murakami, Kawasaki; Yutaka Igarashi, Yokohama; Akira Shiba, Kawasaki; Hajime Hayashi, Yamato; Hirohide Miwa, Kawasaki; Michitoshi Inoue, Osaka; Masayuki Matsumoto, Ashiya, all of Japan

[73] Assignee: Fujitsu Limited, Kawasaki, Japan

[21] Appl. No.: 675,869

[22] Filed: Nov. 28, 1984

[30] Foreign Application Priority Data

Nov. 30, 1983 [JP] Japan ................. 58-225666

[51] Int. Cl.4 .............................. A61B 10/00
[52] U.S. Cl. ........................ 128/660; 73/602
[58] Field of Search ................. 128/660–661; 73/599, 597, 602

[56] References Cited

U.S. PATENT DOCUMENTS 4,154,114  5/1979  Katz et al. ............... 128/660 X
4,403,184  9/1983  Witt et al. ............... 128/660 X
4,453,550  6/1984  Flax ........................ 128/660
4,512,195  4/1985  Miwa et al. .............. 128/660 X

OTHER PUBLICATIONS

Dines, K. A. et al., "Ultrasonic Attenuation Tomography of Soft Tissues", *Ultrasonic Imaging* vol. 1 No. 1, 1979.

Kue, R. et al., "Estimating the Acoustic Attenuation Coefficient Slope for Liver from Reflected UTS Signals", IEEE Trans. on Sonics and Ultrasonics, vol. Su-26 No. 5 Sep. 1979, pp. 353-361.

Jethwa, C. P. et al., "Blood Flow Measurements Using UTS Pulsed Random Signal Doppler System", IEEE Trans. vol. Su-22, No. 1 pp. 1-11, Jan. 1975.

Childers, D. G. et al., "The Cepstrum: A Guide to Processing", Proc. of the IEEE, vol. 65 No. 10, Oct. 1977 pp. 1428-1443.

Oppenheim, A. et al., "Digital Signal Processing", pp. 500-507, Prentice-Hall Publ., 1975.

*Primary Examiner*—Kyle L. Howell
*Assistant Examiner*—Francis J. Jaworski
*Attorney, Agent, or Firm*—Staas & Halsey

[57] ABSTRACT

A diagnosis apparatus for discriminating a property of the tissue to be observed from the reflected ultrasonic wave uses the nature of the fine structure of the tissue, and more practically uses the interval of small reflecting bodies dispersely distributed in the tissue as the parameters. The intervals flucatuate. Therefore, an average value and/or a degree of fluctuation is calculated and is displayed. For obtaining the average interval, a method of using the cepstrum of the received signal or a method of using the self-correlation of the received signal can be used.

14 Claims, 16 Drawing Figures

$$\overline{\Delta f} = \frac{1}{n} \sum_{i=1}^{n} \Delta f i$$

ULTRASONIC DIAGNOSIS APPARATUS FOR TISSUE CHARACTERIZATION

BACKGROUND OF THE INVENTION

This invention relates to an ultrasonic diagnosis apparatus and particularly to a so-called tissue characterization by reflected ultrasonic waves (hereinafter referred to as "reflection type ultrasonic wave TC") which is capable of characterizing the ultrasonic wave medium to be observed, and, more concretely, a living tissue using the ultrasonic wave reflected from said ultrasonic wave medium to be observed.

Recently, attention has focused on a TC which is capable of discriminating kinds of tissues and good or bad characteristics of them rather than on the so-called B mode ultrasonic diagnosis apparatus which assists diagnosis by observing the shape of tissues within the human body.

Figure 1:
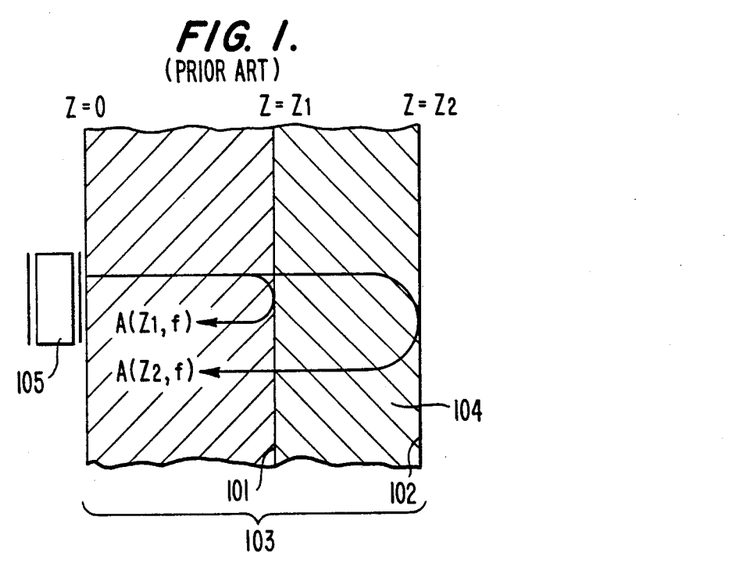
FIG. 1 shows the principle for explanation of the prior art.

The existing reflection type ultrasonic TC has most often used the attenuation characteristic as the parameters for discriminating characteristics of living tissues, for example, whether it is a healthy liver or a liver suffering from cirrhosis. Used in this case in the fact that when the ultrasonic sonic wave travels a distance $\Delta z$, the sound pressure is attenuated by EXP $\{-\alpha(z,f)\Delta z\}$, with $\alpha(z,f)$ considered as a constant which changes depending on place and frequency. For example, as shown in FIG. 1, in order to know the attenuation characteristic of the region 104 between the reflecting surfaces 101, 102 in the ultrasonic wave medium 103 to be observed, the ultrasonic wave is transmitted and received through an ultrasonic vibration unit 105 placed at the position where $z=0$, and the ultrasonic waves reflected from the reflection surfaces 101 and 102 are received. If the power spectrum of the received signal reflected from the reflecting surface 101 is considered to be $A(Z_1, f)$ and if the power spectrum of the received signal reflected from the reflecting surface 102 is $A(Z_2, f)$, and further if the characteristics of the reflecting surfaces (reflection coefficient, etc.) are assured to be the same, then the attenuation characteristic $\alpha(z, f)$ can be obtained from the following relations.

$$A(Z_2, f) = A(Z_1, f) e^{-2\alpha((Z_1+Z_2)/2, f)(Z_2-Z_1)}$$

$$= A(Z_1, f_1) e^{-4\alpha((Z_1+Z_2)/2, f)(Z_2-Z_1)}$$

$$\alpha((Z_1 + Z_2)/2, f) = \frac{\log A(Z_1, f) - \log A(Z_2, f)}{4(Z_2 - Z_1)}$$

This attenuation characteristic can also be obtained by the method already proposed without obtaining the spectrum. However, the existing method using the attenuation characteristic as the parameter involves the following problems.

Firstly, in in the case where the reflecting surfaces 101, 102 shown in FIG. 1 have different frequency characteristics, $\alpha(z,f)$ obtained from the equation (1) is calculated as a frequency characteristic that is different from that of the intrinsic region 104 to be observed.

Secondly, it is said that an attenuation characteristic has a dependency on frequency of about 1 dB/MHz/cm in ordinary living tissues. But an attenuation difference of only 2 dB or so is generated at the upper and lower limits of the region even when an ultrasonic wave having a bandwidth of about 1 MHz, as is used for an ordinary ultrasonic diagnosis apparatus goes and returns through a living tissue of about 1 cm of thickness. It is accordingly hidden by disturbance of the spectrum due to disturbance of the ultrasonic wave beam pattern, and it is difficult to obtain a meaningful attenuation characteristic. For practical use, it is necessary to make the tissue thick and to obtain an average of a large amount of data, thus degrading the space and time resolution.

SUMMARY OF THE INVENTION

It is therefore an object of this invention to provide a means for discriminating normal and abnormal conditions of tissues using the characteristic values related to the structure, such as the average interval of the fine structure in the tissues, etc. as the parameters, in place of the attenuation characteristics, for the tissues wherein the fine structure changes due to a disease, for example, in the case of a myocardium, wherein the fibrous nature increases when myocardial infarction occurs.

It is another object of this invention to obtain easily the parameters indicating the fine structure of said tissue with good accuracy.

Using the fact that an ultrasonic wave reflected from an adjacent reflecting body in a living tissue is received as the superposed waveforms, a characteristic waving phenomenon called scallopping appears in the power spectrum, this invention estimates a degree of superposition (interval of reflecting body) from the intervals between peaks and valley, or estimates a degree of superposition by calculating the self-correlation of the received signal of the superposed ultrasonic pulses.

DESCRIPTION OF THE PREFERRED EMBODIMENTS

After first describing the principle, preferred embodiments of this invention will then be explained by referring to the drawings.

Figure 2A:
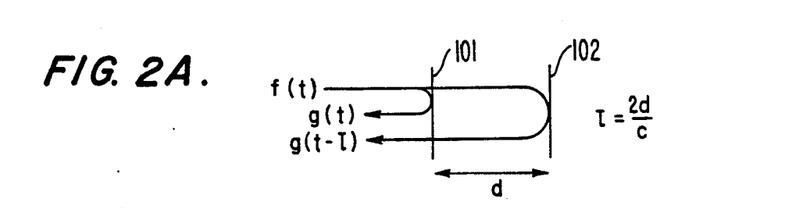
FIGS. 2A to 2D, FIG. 3 and FIG. 5 show the concept of this invention.

In general, as shown in FIG. 2A, when an incoming wave f(t) is reflected by the reflecting surfaces 101, 102 arranged adjacently, the received signal r(t) is the superposition of the wave g(t) reflected from the surface 101 and the wave $g(t-\tau)$ reflected from the surface 102, wherein attenuation by transmission is neglected. That is, $$r(t) = g(t) + g(t-\tau) \tag{2}$$

Wherein $\tau=2d/c$, c is the sound velocity and d is the interval between reflecting surfaces.

The equation (2) can be modified by Fourier transformation.

$$R(f) = \int_{-\infty}^{\infty} \{g(t) + g(t - \tau)\}e^{-j2\pi ft}\, dt \qquad (3)$$

$$= G(f) + e^{-j2\pi f\tau} \cdot G(f)$$

$$= G(f)(1 + e^{-j2\pi f\tau})$$

Wherein R(f) is the Fourier transformation of r(t) and G(f) is the Fourier transformation of g(t).

Accordingly, its power spectrum can be expressed as follows.

$$|R(f)|^2 = |G(f)|^2(2+2\cos 2\pi f\tau) \qquad (4)$$

Figure 2B:
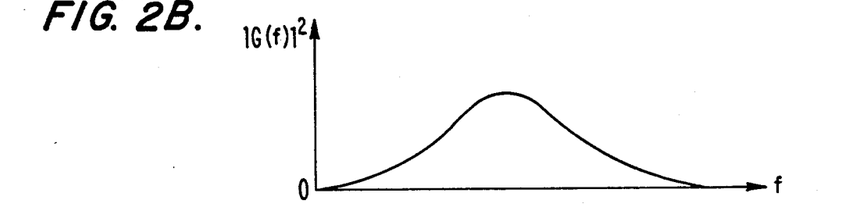
Figure 2C:
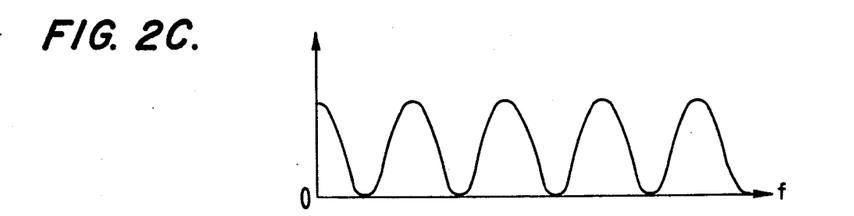
Figure 2D:
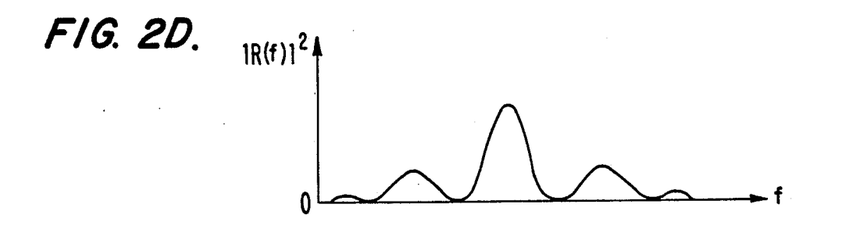

Namely, the original power spectrum $|G(f)|^2$ of FIG. 2B receives the distortion $2+2\cos 2\pi f\tau$ of FIG. 2C, and the power spectrum has the waving phenomenon as in FIG. 2D. This waving phenomenon is called scallopping. In this case, the period $\Delta f$ of the waving is expressed as $$\Delta f = 1/\tau = c/2d \qquad (5)$$

and when $\Delta f$ is known, a value of d can b obtained because c is already known. It is of course possible to use $\Delta f$ in place of d as the parameter which indicates the characteristic of the tissue.

Figure 3:
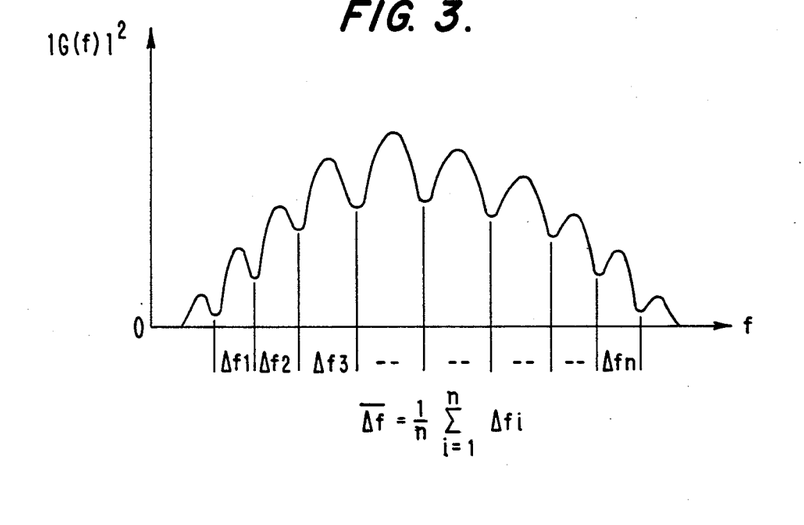

Actual living tissue does not have a simple double-layer structure as described above, and many fine reflecting bodies with different reflection coefficients are arranged in different interval. Thus a power spectrum as shown in FIG. 3 can be obtained, having a average period of the waving phenomenon almost corresponding to the average interval of the reflecting bodies. Therefore, an average interval of the reflecting bodies in the region to be observed can be obtained by knowing the average period $\Delta f$ of the waving phenomenon, and an effective diagnostic method can be realized for the region wherein a disease can be estimated from the difference of the average of the intervals of the reflecting bodies. This diagnostic method is effective for a diseased region, such as a myocardial infarction. The myocardium is generally made of almost homogeneous muscle layer. In the normal condition, the average interval $\bar{d}$ of the reflecting bodies looks very small and, since the average value of the $\overline{\Delta f}$ of scallopping period is very large, it does not have much influence on the waving phenomenon of the power spectrum of the receiving signal. However, if the myocardial infarction occurs, the tissue becomes fibrous and, moreover, since the interval of the fibers has a certain size, the waving phenomenon of the spectrum becomes distinctive. Accordingly, the degree of the myocardial infarction can be estimated by knowing the interval $\Delta f$ of the waving phenomenon.

The intervals $\Delta fi$ of the waving phenomenon of said spectrum actually vary a little from each other, and it is therefore required to obtain their average value or the degree of their fluctuation. In this case, the frequencies indicating peak and valley are detected from the shape of the spectrum, the differences of the intervals $\Delta fi$ are obtained and moreover an average of the intervals is obtained. But, these calcuations are comparatively troublesome and each peak of the spectrum is not always neatly separated from the others. Namely, each peak itself is waving and it is therefore difficult in some cases to accurately determine the peak position.

This invention thus proposes a method using the cepstrum, and a further method using the self-correlation, as methods of accurately and easily obtaining the average interval $\overline{\Delta f}$.

The cepstrum means that a spectrum is logarithmically compressed and is then transformed by the Fourier transformation. Since it is a known concept, detailed explanation of it is omitted here. For detail, refer to A. V. Oppenheim, R. W. Schafer, "Digital Signal Processing", pp 500 to 507, Prentice-Hall, 1975.

Figure 4:
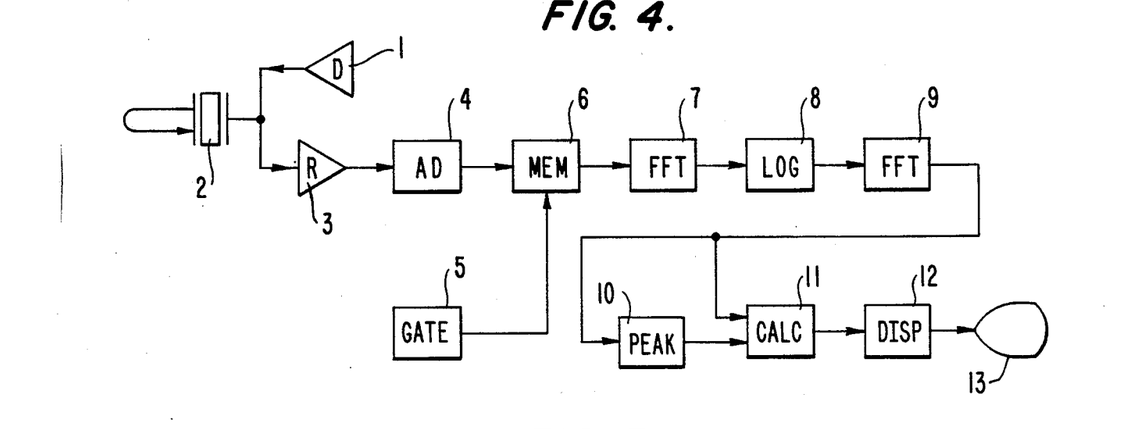
FIG. 4 is a block diagram of an embodiment of this invention.
Figure 5:
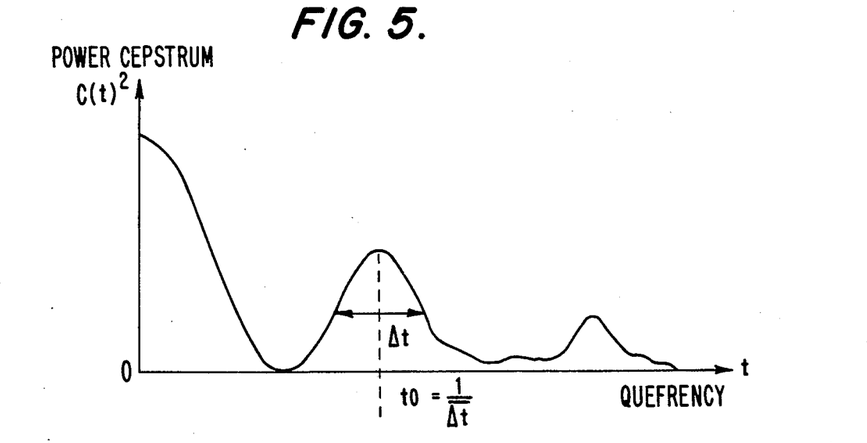

FIG. 4 is a block diagram concerning a method of using the cepstrum. With a driving signal sent from a transmitter 1, a vibration unit 2 sends the ultrasonic wave to a medium (living tissue) to be observed. The reflected wave is received again by the vibration unit 2 and it is amplified by a receiver 3 and thereafter sent to an analog-to-digital converter (hereinafter referred to as AD converter). It is a matter of course that so-called TGC (Time Gain Control) amplification, logarithmic amplification or AGC (Auto-Gain Control) amplification may be employed for such amplification process. An output of the AD converter 4 is, for example, stored in a memory 6, only for the period designated by an output of a gate timing generating circuit 5 which turns ON only when a reflected wave is being received from the wall of the heart. In this case, this AD converter must naturally be operated with a frequency (for example, 3.5 MHz $\times 4 = 14$ MHz or more) which is sufficiently higher than the ultrasonic wave frequency (for example, 3.5 MHz) to be used. The content of memory 6 is sent to a Fourier transformation circuit 7 for calculation of the power spectrum. The Fourier transformation circuits 7 and 9 can be realized, for example, by an LSI for signal processing comprising a multiplier, accumulator, data memory and a control memory, etc. The output of the Fourier transformation circuit 7 is sent again to the Fourier transformation circuit 9 through a logarithmic converter 8, and thereby the power cepstrum $|C(t)|^2$ as shown in FIG. 5 is obtained for the power spectrum shown in FIG. 3, as an output of the Fourier transformation circuit 9. A peak detector 10 obtains an approximate quefrequency $t_0$ of the peak value other than the origin, as shown in FIG. 5. Since $|C(t)|^2$ can be obtained by Fourier transformation of the logarithm of $|G(f)|^2$, this $t_0$ is approximately equal to the inverse of an average period $\overline{\Delta f}$ of the scallopping of the spectrum shown in FIG. 3.

In the calculating circuit 11, the average value of the intervals of the scalloping, which is a characteristic parameter of the tissue, can be obtained by the equation indicated below.

$$\overline{\Delta f} = 1/t_0 \qquad (6)$$

It is also possible to obtain $$d = c/2\overline{\Delta f} = ct_0/2 \qquad (7)$$

from the equation (5). The spread of the cepstrum around the quefrency value $t_0$ as indicated by $\Delta f$ of FIG. 5 corresponds to fluctuation of the frequency interval $\Delta fi$ of the scallopping of the power spectrum of FIG. 3. Accordingly, the fluctuation of $\Delta fi$ can be estimated by obtaining the dispersion of the cepstrum around the quefrency $t_0$ in the range ($t_0-T$, $t_0+T$, where T is a predetermined constant) of time duration predetermined sound $t_0$, namely the secondary moment $$m_2 = \int_{t_0-T}^{t_0+T} (t-t_0)^2 |C(t)|^2 dt \qquad (8)$$

and thereby this can also be used as a characteristic parameter of the tissue.

Morever, it is natural to use nth order moments (n=1, 2, 3, ...) as the characteristic parameters. The calculation circuit 11 of FIG. 4 also performs the calculation for the above moments, using the cepstrum output from the Fourier transformation circuit 9 as an input. The result obtained by the calculation circuit 11 is sent to a display circuit 12, and is finally sent to the display 13. The logarithmic converter 8 of FIG. 4 can be realized as a code converter using a ROM (Read Only Memory), while the peak detector 10 can be realized by an LSI for signal processing as in the case of the Fourier transformers 7 and 9. In the case that high speed processing is not particularly required, it is a matter of course that the circuits 7 to 11 are realized with a programmable LSI for signal processing, which is generally referred to as a microcomputer.

Figure 6:
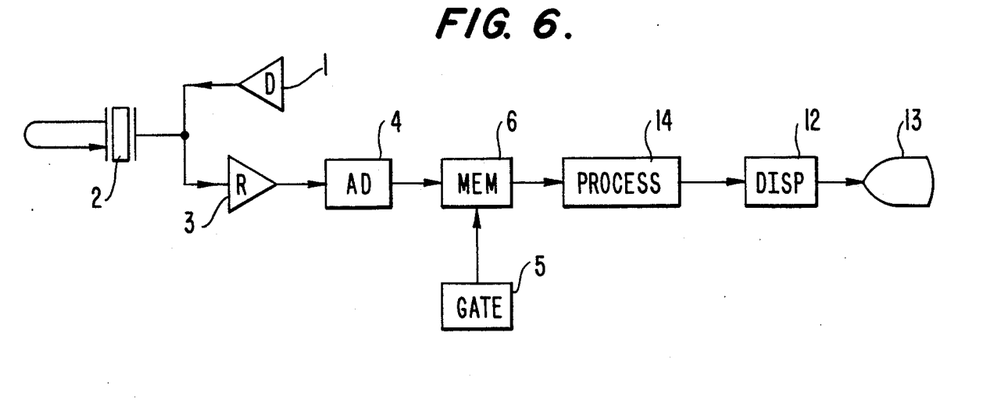
FIG. 6 is a block diagram of another embodiment of the invention.

The value $t_0$ in FIG. 5 indicates an approximate average value of the intervals between the reflecting bodies, and therefore if a self-correlation function of the receiving signal is obtained, a peak of the self-correlation must appear when a time deviation $\tau$ is equal to almost $t_0$. In other words, the receiving signal f(t) of the selected region is stored in the memory 6 of FIG. 6, and the self-correlation expressed by the following equation is obtained at the signal processing circuit 14 for such memory content.

$$\phi(\tau) = \int_{t_1}^{t_2} f(t) \cdot f(t-\tau) dt \qquad (9)$$

Wherein, $t_1$, $t_2$ are the times corresponding to when the signals are received from the selected depths. When a time deviation $\tau_0$ which gives approximately the first peak value aside from the origin of $\phi(\tau)$ is obtained, it is approximately equal to the quefrency value $t_0$ of FIG. 5. As an embodiment, it is enough when a processing program of the signal processing circuit is prepared for obtaining self-correlation and also for obtaining a time deviation which gives the first peak value aside from the peak at the origin.

Regarding a method of displaying the results obtained, $t_0$, $\overline{\Delta f}$, $m_2$, $\tau_0$ may be displayed by numerals (in units of $\mu$sec, MHz, etc.), and such a display can easily be realized by providing a well-known character pattern generating function to a display control circuit 12, as shown in FIG. 6.

Figure 7:
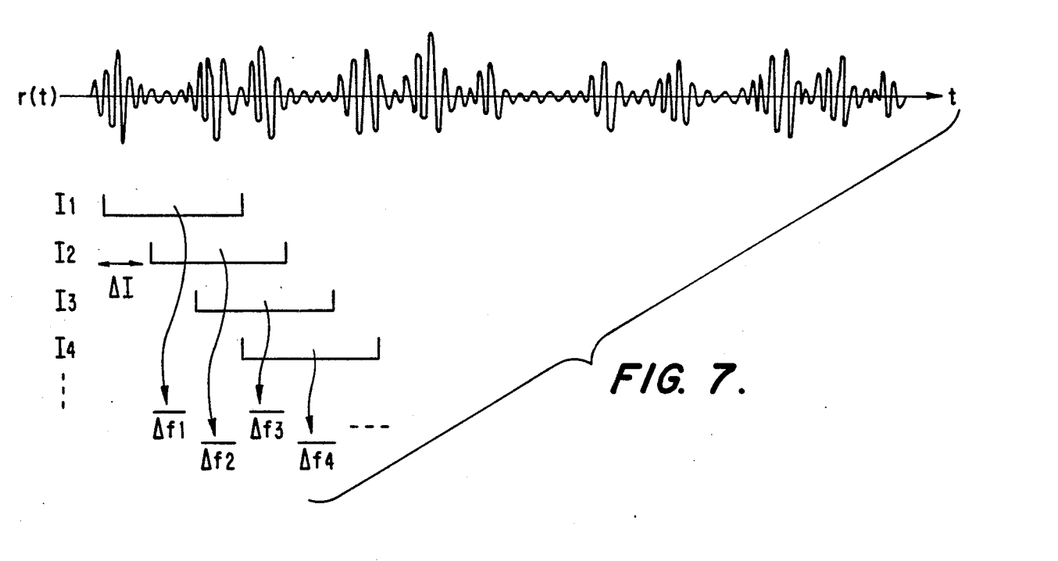
FIG. 7 shows the principle of sliding window.

Furthermore, the distribution of $t_0$, $\overline{\Delta f}$, $m_2$, $\tau_0$ as described above on the ultrasonic scanning line can also be obtained. As shown in FIG. 7, in the so-called sliding window method the receiving signals r(t) are sequentially delayed as the signals of $I_1$, $I_2$, $I_3$, ... with a small delay time of $\Delta I$ and the transmission time is divided into the super-imposing time sections, and the parameters such as $t_0$, $\overline{\Delta f}$, $m_2$, $\tau_0$ obtained by the method described above using the signals in each time section are displayed under the supposition that these are values at the center of each section. Thus, a parameter distribution on the ultrasonic scanning line can also be obtained.

Figure 8:
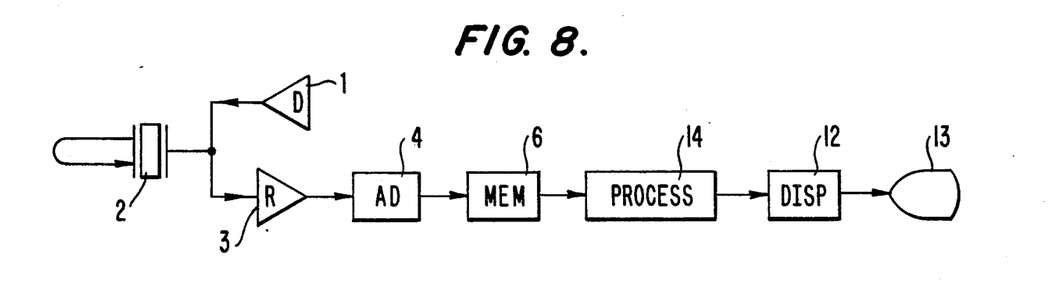
FIG. 8 shows a block diagram of an embodiment for obtaining uni-dimensional distribution of parameters used in this invention.

In the case of using this method, it is enough that not only the reflected wave data of one processing section but also all data on the scanning line are stored once in the memory, and thereafter $t_{0i}$, $\Delta f_i$, $m_{2i}$, $\tau_{0i}$ (i=1, 2, 3, . . . ) are obtained for only the signal of the required time sections $I_i$ (i=1, 2, 3, . . .), and the obtained result is sent to the memory for display. The constitution of an embodiment is shown in FIG. 8. This embodiment is different from that in FIG. 6 only in the point that the gate timing generating circuit 5 which gives a particular time section is eliminated and the receiving signals are all stored for each time section. The same component elements are given the same symbols and explanation of them is omitted.

Figure 9A:
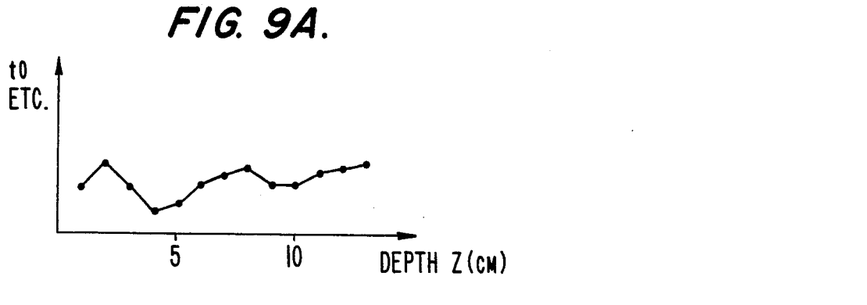
FIGS. 9A, 9B shows an example of display method in the block diagram of FIG. 8.

Regarding a method of displaying the distributions of $t_0$, $\overline{\Delta f}$, $m_2$ and $\tau_0$, these can be displayed with the diagnostic distance (depth from the body surface) plotted on the one axis of the rectangular coordinate as shown in FIG. 9A and the values of the parameters obtained by the processing of the signals can be plotted on the other axis. Change in the value of each parameter depending on the diagnostic distance can easily be seen by such a display method. The constitution of the embodiment may be the same as FIG. 8, and the only difference is that it is necessary to provide the so-called frame memory for the bit map in the display 12 of FIG. 8, in order to store a graphic pattern as shown in FIG. 9A.

Figure 9B:
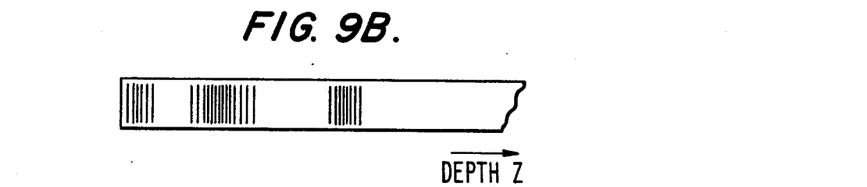
Figure 10A:
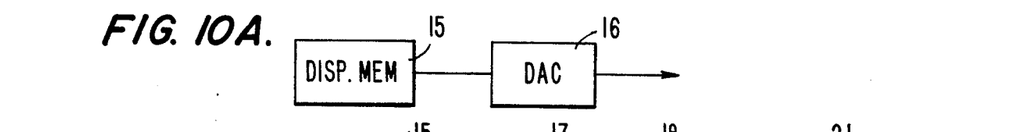
FIGS. 10A, 10B show the block diagram of an embodiment for realizing the display example of FIG. 9B.
Figure 10B:
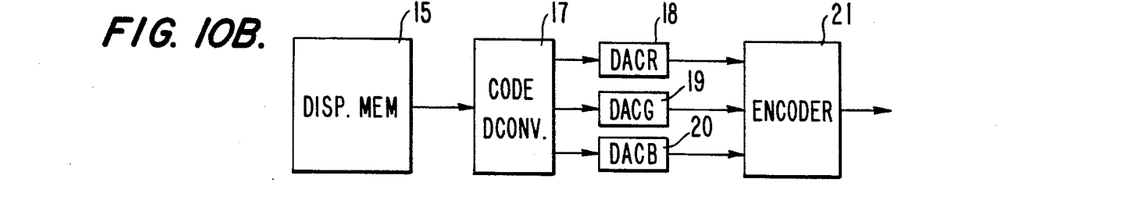

As shown in FIG. 9B, it is also possible that the distribution of parameters on the ultrasonic wave scanning line can be displayed by assigning a corresponding brightness or color to the parameter value obtained by signal processing. The constitution of an embodiment in the case of employing such a display method is the same as that shown in FIG. 8, but a circuit for brightness modulation or color modulation is required in the display control circuit 12. First, in the case of brightness modulation, as shown in FIG. 10A, a digital-to-analog converter (hereinafter referred to as a DA converter) 16 for generating a voltage of an amplitude corresponding the parameter value is provided after a display data memory 15 which stores the parameter values obtained by the signal processing circuit, and thereby such a voltage is sent as an image signal to the display 13. Next, in the case of displaying parameter values with colors, as shown in FIG. 10B, a code converting circuit 17 for the primary colors of a display (usually, a color television receiver), which is required for expressing the colors assigned to values of parameters, is connected after a data memory 15 for display, and DA converters 18~20 for converting the outputs of the code converting circuit 17 to each primary color are provided after such code converting circuit 17. Moreover, if the display requires, a color encoder 21 for generating composite color signals corresponding to an output voltage of each DA converter is provided in order to send a signal to the color display 13 of FIG. 6. In the above explanation, a synchronous signal that is required for television display is naturally necessary and its explanation is omitted.

Figure 11:
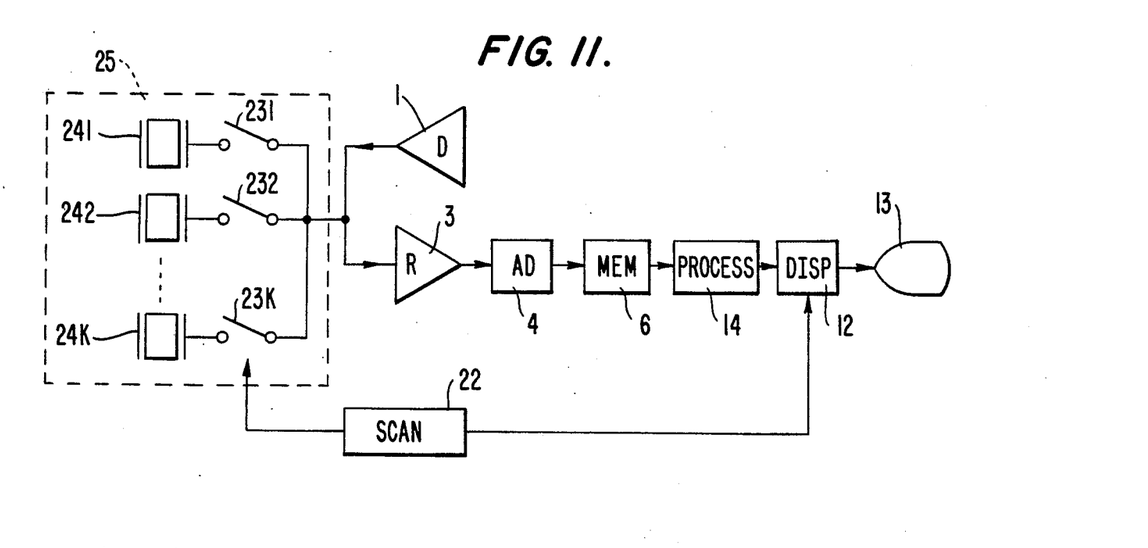
FIG. 11 is a block diagram of an embodiment for obtaining two- or three-dimensional distribution of parameters used in this invention.

The distribution of each of the parameters such as $t_0$, $\overline{\Delta f}$, $m_2$, $\tau_0$ can be obtained as described above on a single-dimensional ultrasonic scanning line, but the approach can also be expanded to two- or three-dimensional scanning. The constitution of embodiment for this purpose is shown in FIG. 11. In FIG. 11, the same component elements as those in FIG. 6 are given the same numbers and further explanation of them is omitted. FIG. 11 shows an embodiment of a so-called electronic scanning ultrasonic diagnosis apparatus. In this figure, 25 is a probe for electronic scanning, which consists of the arranged vibration units 241, 242, ..., 24K and the vibration unit selection switches 231, 232, ..., 23K. 22 is a scanning control circuit which causes the ultrasonic wave beam to scan in the direction of the arrangement by switching ON and OFF the switches 231, 232, ..., 23K in some sequence, and which writes the result of signal processing of the memory address for display in correspondance to the position of the arrangement direction of the ultrasonic wave beam. The two-dimensional distribution of parameters $t_0$, $\Delta f$, $m_2$, $\tau_0$ can be obtained by writing such parameters in the frame memory in the display 12 by the method described above, for each change of position of the ultrasonic wave beam with the control of the scanning control circuit. Said a frame memory is provided, in place of only the data memory for display of FIG. 10, in order to store the two-dimensional data of these parameters. Although omitted in the above explanation, a beam focusing means such as a dynamic focus can, of course, be executed from the control of the ultrasonic wave beam.

The above explanation is aimed at electronic scanning but can, of course, be adapted to a mechanical scanning system.

The two-dimensional distribution of the above parameters can be obtained as described above, and a three-dimensional distribution of parameters can further be obtained by the following process. The probe 25 is moved in the direction at a right angle to the arrangement of the vibration units, the moving pitch thereof is controlled or measured, the two-dimensional distribution of the parameters are stored in different frame memories for each movement (or in different blocks by dividing the same frame memory into a plurality of blocks), and the result is displayed in line on the same screen.

Usually, the reflected ultrasonic wave changes in waveform and spectrum, etc. largely due to a small difference of the structure of the reflecting tissues. Therefore, it is often required for obtaining stable data (parameter values) to obtain an average value of the data in the range of several millimeters square, even if the space resolution is a little degraded. Even in such a case, the circuit of FIG. 11 can be directly used as the embodiment and it is only required that the program of the signal processing circuit 14 and of the scanning control circuit 22 be modified. Therefore, further explanation is omitted.

As described above, according to this invention, discrimination of a thin tissue can be realized more accurately than in the existing method by using the interval of the frequencies of scallopping, which indicates the roughness of the structure of the tissue, or its inverse number, in place of an attenuation characteristic which has often been used in the existing ultrasonic TC. In other words, measurement with a high resolution as a function of depth can be realized in diagnosis.

We claim:

1. An ultrasonic apparatus for use in diagnosis, by transmitting an ultrasonic wave to a region in a body to be observed and by receiving and processing the reflected ultrasonic wave, said body having a plurality of small reflecting bodies dispersely distributed in said region, said apparatus comprising:

ultrasonic means for transmitting said ultrasonic wave to said region and for receiving said reflected ultrasonic wave and for outputting a signal corresponding to said reflected ultrasonic wave;

extracting means for receiving said signal corresponding to said reflected ultrasonic wave, and for extracting at least one particular time section thereof corresponding to reflection of said ultrasonic wave from said region, and for providing a corresponding output; and averaging means, receiving as an input the output of said extracting means, for determining an average period of scallopping in the power spectrum of the one particular time section of said reflected ultrasonic wave, said scallopping caused by the small reflecting bodies in said region.

2. An ultrasonic diagnosis apparatus in accordance with claim 1, wherein said averaging means converts the power spectrum into a power cepstrum and outputs as the average period of scallopping a value corresponding to a quefrency of a peak value of the power cepstrum immediately following a peak at the origin thereof.

3. The apparatus of claim 2, wherein said output of said averaging means represents said quefrency of the peak value of said power cepstrum immediately following the peak value at the origin.

4. The apparatus of claim 2, wherein said output of said averaging means represents the inverse of said quefrency of the peak value of said cepstrum immediately following the peak value at the origin.

5. The apparatus of claim 2, wherein said averaging means determines at least one number corresponding to the spread of said cepstrum about said quefrency of the peak value of the cepstrum immediately following the peak value at the origin thereof.

6. The apparatus of claim 5, wherein said at least one number corresponding to the spread of the cepstrum is a secondary moment of the cepstrum around the quefrency of the peak value.

7. The apparatus of claim 1, comprising display means for receiving said output of said averaging means and for providing a display corresponding to said average value of said spacing of said small reflecting bodies in said region.

8. An ultrasonic diagnosis apparatus for use in diagnosis, by transmitting an ultrasonic wave to a region in a body to be observed and by receiving and processing the reflected wave, said body having a plurality of small reflecting bodies dispersely distributed in said region, said apparatus comprising:

ultrasonic means for transmitting said ultrasonic wave to said region, for receiving said reflected ultrasonic wave and for providing a respective output signal corresponding to said reflected ultrasonic wave;

extracting means for receiving said output signal from said ultrasonic means for extracting at least one particular time section thereof corresponding to reflection of said ultrasonic wave from said region, and for providing a corresponding output;

spectrum means for receiving said output of said extracting means, and for providing an output corresponding to a power spectrum of said extracted time section, wherein said power spectrum demonstrates intervals of scallopping caused by the small reflecting bodies dispersely distributed in said region;

averaging means for receiving said output of said spectrum means, and for providing an output corresponding to the average value of said intervals of scallopping in said power spectrum; and display means for receiving said output of said averaging means and for providing a display corresponding to said average value.

9. The apparatus of claim 8, wherein said display by said display means indicates said intervals of scallopping.

10. The apparatus of claim 8, wherein said display by said display means indicates the inverse of each said interval of scallopping.

11. A method of determining a characteristic of tissue in a region having small reflecting bodies dispersely distributed therein, comprising the steps of:

(a) transmitting an ultrasonic wave into the region and receiving the ultrasonic wave reflected from the small reflecting bodies as a received signal;

(b) processing the received signal to obtain a cepstrum signal representing a cepstrum of the received signal; and (c) providing a peak quefrency signal by processing the cepstrum signal to determine a non-zero peak quefrency in the cepstrum, the non-zero quefrency corresponding to an average spacing interval of the small reflecting bodies.

12. A method in accordance with claim 11, further comprising the step of (d) processing the cepstrum signal to obtain a fluctuation signal representing a moment about the non-zero peak quefrency and corresponding to fluctuations in the spacing of the small reflecting bodies.

13. A method in accordance with claim 12, wherein the moment is a secondary moment.

14. A method in accordance with claim 13 further comprising the step of (e) displaying an indication of the non-zero peak quefrency and the second moment.

* * * * *

UNITED STATES PATENT AND TRADEMARK OFFICE
CERTIFICATE OF CORRECTION

PATENT NO. : 4,655,228

DATED : April 7, 1987

INVENTOR(S) : Shimura et al.

It is certified that error appears in the above-identified patent and that said Letters Patent is hereby corrected as shown below:

[57] ABSTRACT, line 6, "flucatuate" should be --fluctuate--.

Col. 1, line 24, "in" (2nd occurrence) should be --is--.

line 45, the right side of the equation should read:

$$A(Z_1,f) \{e^{-2\alpha((Z_1 + Z_2)/2, f)(Z_2 - Z_1)}\}^2$$

line 47, "$f_1$" should be --f--.

line 56, delete "in" (second occurrence).

Col. 3, line 28, "b" should be --be--;

line 41, " $\Delta f$" should be -- $\overline{\Delta f}$--;

Col. 6, line 4, " $\Delta f$;" should be -- $\overline{\Delta f_i}$--.

Signed and Sealed this

Fifteenth Day of September, 1987

*Attest:*

DONALD J. QUIGG

*Attesting Officer*      *Commissioner of Patents and Trademarks*